(12) United States Patent
Bayat et al.

(10) Patent No.: US 10,876,876 B2
(45) Date of Patent: *Dec. 29, 2020

(54) SYSTEM AND METHOD FOR MONITORING AND LOGGING COMPRESSED GAS DATA (71) Applicant: Bauer Compressors, Inc., Norfolk, VA (US)

(72) Inventors: Anthony B. Bayat, Virginia Beach, VA (US); Tahsin Durak, Norfolk, VA (US); Adam Z. Howard, Virginia Beach, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,153

(22) Filed: Apr. 13, 2020

(65) Prior Publication Data
US 2020/0240824 A1 Jul. 30, 2020

Related U.S. Application Data (63) Continuation-in-part of application No. 16/054,041, filed on Aug. 3, 2018, now Pat. No. 10,663,960.

(51) Int. Cl.
*G01F 15/06* (2006.01)
*G06F 21/33* (2013.01)
(Continued)

(52) U.S. Cl.
CPC .......... *G01F 15/063* (2013.01); *G06F 3/0482* (2013.01); *G06F 3/04817* (2013.01);
(Continued)

(58) Field of Classification Search
CPC ............ G05B 19/0425; G05B 23/0216; G05B 23/0272; G05B 19/042; G05B 23/0283; G05B 19/409; G05B 15/02; G05B 11/01; G05B 13/02; G06F 3/04817; G06F 21/606; G06F 3/048; G06F 3/04842; H04L 29/06; H04L 63/0428; H04L 67/34; H04L 67/12; H04L 69/329; H04L 63/083; H04L 67/18; H04L 67/42; G06Q 10/06; G06Q 10/10; C02F 1/008; H04W 4/50; H04W 56/0025;
(Continued)

(56) References Cited

U.S. PATENT DOCUMENTS

9,489,832 B2 * 11/2016 Nair ...................... G05B 19/418
9,989,958 B2 * 6/2018 Asenjo ............... G05B 19/4185
(Continued)

*Primary Examiner* — Philip J Chea
*Assistant Examiner* — Mohammed Ahmed
(74) *Attorney, Agent, or Firm* — Peter J. Van Bergen (57) ABSTRACT

Compressed gas data is monitored and logged. A communication interface is coupled to a device supporting at least one of flow and storage of a compressed gas. The device senses data related to the compressed gas. The data is automatically collected via the communication interface at a first data store every first time increment of a first time period. Portions of the data from the first data store are automatically collected at a second data store every second time increment of each first time period. The second time increment is greater than the first time increment. The portions of the data are collected for a second time period which is greater than the first time period.

32 Claims, 9 Drawing Sheets

(51) Int. Cl.
  *G06F 3/06* (2006.01)
  *G06F 3/0482* (2013.01)
  *G06F 3/0481* (2013.01)

(52) U.S. Cl.
  CPC .......... *G06F 3/0604* (2013.01); *G06F 3/0659* (2013.01); *G06F 3/0673* (2013.01); *G06F 21/33* (2013.01)

(58) Field of Classification Search
  CPC ... H04W 56/0015; H04W 4/70; H04W 4/029; H04W 4/023
  See application file for complete search history.

(56) References Cited

U.S. PATENT DOCUMENTS

| | | | | |
|---|---|---|---|---|
| 2005/0005093 | A1* | 1/2005 | Bartels | H04L 67/12 713/150 |
| 2007/0163965 | A1* | 7/2007 | Wolfe | C02F 1/008 210/739 |
| 2009/0089709 | A1* | 4/2009 | Baier | G05B 19/409 715/817 |
| 2013/0333014 | A1* | 12/2013 | Batara | G06Q 10/10 726/7 |
| 2014/0277618 | A1* | 9/2014 | Nixon | G05B 15/02 700/83 |
| 2018/0063666 | A1* | 3/2018 | Broodney | H04W 4/70 |
| 2018/0259338 | A1* | 9/2018 | Stokes | G01C 21/203 |

* cited by examiner

SYSTEM AND METHOD FOR MONITORING AND LOGGING COMPRESSED GAS DATA

This is a continuation-in-part application of co-pending application Ser. No. 16/054,041, "SYSTEM AND METHOD FOR CONTROLLING OPERATIONAL FACETS OF A COMPRESSOR FROM A REMOTE PLATFORM", filed on Aug. 3, 2018.

FIELD OF THE INVENTION

The invention relates generally to compressed gas operations, and more particularly to a system and method for monitoring and logging compressed gas data.

BACKGROUND OF THE INVENTION

High-pressure compressors along with their auxiliary devices (e.g., valves, flow meters, sensors, etc.) are used for a variety of applications across a variety of industries to include compressed natural gas operations, manufacturing, industrial plants, oil/gas compression, and breathing gas systems. Efficient and safe operation of these complex compressor systems are clearly important goals for both system owners and operations personnel. While real-time monitoring of such compressor systems is a given, historical data related to past performance of the compressor system can provide critical insight into future maintenance issues and potential system faults. Past performance data can be used, for example, to adjust current operational parameters as well as predict maintenance needs. Unfortunately, past performance data as well as skilled data analysis personnel are not always available on site thereby leaving many high-pressure compressor systems vulnerable to poor performance, unexpected maintenance-issue shutdowns, and potential catastrophic failures.

SUMMARY OF THE INVENTION

Accordingly, it is an object of the present invention to provide a method and system for remotely controlling multiple operational facets of a compressor system to include real-time monitoring and remote control of compressor operations.

Another object of the present invention to provide a method and system for remotely controlling multiple operational facets of a compressor system to include report generation related to past performance of compressor operations.

Still another object of the present invention to provide a method and system for remotely controlling multiple operational facets of a compressor system to include report generation related to predictive analytics based on past performance of compressor operations.

Other objects and advantages of the present invention will become more obvious hereinafter in the specification and drawings.

In accordance with an embodiment of the present invention, a method is provided for monitoring and logging compressed gas data. A communication interface is coupled to a device supporting at least one of flow and storage of a compressed gas. The device senses data related to the compressed gas. The data is automatically collected via the communication interface at a first data store every first time increment of a first time period wherein, at a conclusion of each first time period, the first data store employs a wraparound storage scheme. Portions of the data from the first data store are automatically collected at a second data store every second time increment of each first time period. The second time increment is greater than the first time increment. The portions of the data are collected for a second time period which is greater than the first time period.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
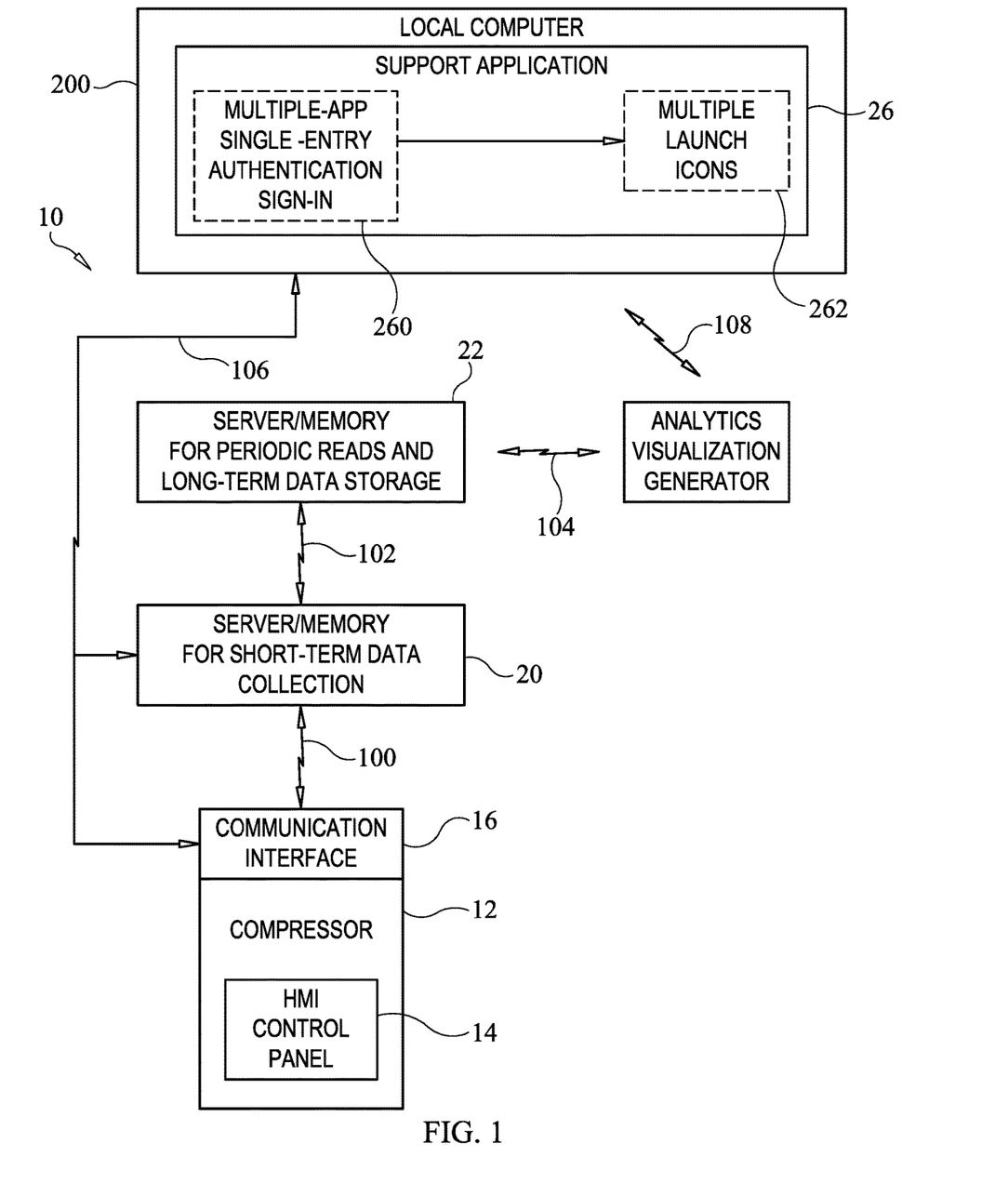
FIG. 1 is a schematic view of a compressor system that provides for control of multiple on a remote platform in accordance with an embodiment of the present invention.

Referring now to the drawings and more particularly to FIG. 1, a compressor system whose multiple operational facets are controlled from a remote platform in accordance with an embodiment of the present invention is shown and is referenced generally by numeral 10. As used herein, the phrase "operational facets" includes real-time monitoring of the operation of a compressor and the auxiliary devices used therewith, real-time operational control of the compressor and its auxiliary devices, past performance report generation related to the past operation of the compressor and its auxiliary devices, and predictive analytics report generation related to predicting future operation of the compressor and its auxiliary devices based on past performance data. It is further to be understood that the phrase "remote platform" includes a variety of computing devices (i.e., ones having a processor, memory, and wireless transceiver) that are remotely-located with respect to the compressor and its auxiliary devices. For example, a "remote platform" as used herein can be a hand-held wireless device such as a smart phone or tablet.

In general, communication between the various elements of compressor system 10 is accomplished in a wireless fashion over a wireless network (e.g., the internet or worldwide web) using a wireless communication protocol, the choice of which is not a limitation of the present invention. In the illustrated embodiment, wireless or other types of two-way communication are indicated by the use of two-headed arrows. For clarity of illustration, the wireless network is omitted from the drawings. Relays of the wireless communication can be carried out globally.

Compressor system 10 includes a compressor 12 that is typically part of a larger industrial, manufacturing, or other compressor-using application (not shown). As would be well-understood in the art, compressor 12 will generally include and/or be coupled to a variety of auxiliary or operation-supporting devices (not shown) such as sensors, flow meters, valves, conduits, etc. For simplicity of illustration, only a single compressor 12 is shown. However, it is to be understood that the present invention could include multiple compressors 12 without departing from the scope of the present invention. Compressor 12 includes a "human machine interface" (HMI) control panel 14 that is a touch screen display presenting a user interface locally at compressor 12 for entering inputs/commands that govern operational control of compressor 12. The particular appearance, arrangement of icons, and controllable compressor functions presented by HMI control panel 14 are not limitations of the present invention.

A communications interface 16 is coupled to compressor 12. For compressor systems utilizing multiple compressors, each such compressor will have its own communications interface 16 coupled thereto. Communications interface 16 can be integrated into the design of compressor 12 or could be added to an existing compressor 12 without departing from the scope of the present invention. In general, communications interface 16 supports wireless transmission and reception of signals. For purpose of the present invention, communications interface 16 wirelessly transmits/relays operational data from compressor 12 and wirelessly receives/relays control signals to compressor 12 as indicated by two-headed arrow 100.

The present invention automatically collects operational data from compressor 12 and automatically archives portions of the operational data for periods of time that typically span the multiple years associated with the useful life of compressor 12. As will be explained further below, the operational data is made available at a remote location for reviewing/monitoring and for use in a variety of diagnostic routines that generate a variety of visual diagnostics in the form of graphs, charts, tables, etc. The present invention uses a novel two server/memory approach to collecting operational data to support both real-time monitoring of and historical report generation related to a compressor's operational facets. As used herein, the term "server/memory" refers to a programmable device/system that supports network/internet communication and data storage. The two server/memory approach described further below provides for a new compressor operations paradigm covering the entire life span of a compressor. Further and as will be explained in greater detail below, the present invention provides for all of the above to be controlled from a remote location.

The two server/memory approach uses a first server/memory 20 that is programmed to automatically collect and store operational data related to compressor 12 for a short period of time (e.g., days) using wireless communication 100, and a second server/memory 22 that is programmed to automatically collect and store portions of the data collected/stored at server/memory 20 over a long period of time (e.g., years). While the particular designs of server/memory 20 and server/memory 22 are not limitations of the present invention, both servers/memories must be programmable and capable of wireless communication there between as indicated by two-headed arrow 102.

In general, server/memory 20 samples data from compressor 12 at a higher rate than server/memory 22 samples data from server/memory 20. Further, server/memory 20 stores the higher-sampled data for a relatively short period of time (e.g., 30 days or less), but does so using a wrap-around storage scheme. In this way, server/memory 20 collects a sufficient amount of operational data suitable for use in real-time monitoring of compressor operation, while simultaneously providing for data storage efficiency. A data sampling rate for server/memory 20 is generally ten seconds or less. For server/memory 22, a data sampling rate for periodic reads or data collection from server/memory 20 is generally at least one minute, and can be longer depending on the type of operational data being collected by server/memory 22. The periodically-collected operational data is stored/maintained at server/memory 22 to support past performance and predictive analytic reporting as will be explained further below. Accordingly, server/memory 22 is configured and programmed to store operational data for a number of years defined by, for example, the life expectancy of compressor 12.

Compressor system 10 also includes an analytics visualization generator 24 that, in general, provides a platform for storage of a number of diagnostic routines whose inputs are drawn from the periodically-stored operational data maintained at server/memory 22. In the illustrated example, visualization generator 24 communicates wirelessly with server/memory 22. Visualization generator 24 can be a custom-design hardware/software system, or can be a customizable "dashboard" of pre-programmed diagnostic visualization tools arranged in accordance with the need of a particular application. One such customizable dashboard is DOMO available from Domo, Inc., American Fork, Utah.

As mentioned above, compressor system 10 is controllable from a remote location through the use of a local computer 200 that can be a smart phone, tablet, laptop computer, desk top computer, etc. As used herein, the term "local computer" refers to any internet-accessing computer that is remotely located with respect to compressor 12 where "remotely located" includes short distances (e.g., at/near the facility housing compressor 12, across town from compressor 12, etc.) and long distances (e.g., tens, hundreds or even thousands of miles from compressor 12). For purpose of description, it will be assumed that local computer 200 is a hand-held device. Local computer 200 has a support application or "app" 26 installed thereon as part of a purchase or subscription service. When activated on local computer 200, support app 26 requests/prompts the user to input user authentication data (e.g., a username and password). More specifically, app 26 presents a single-entry, multiple-app authentication sign-in display 260 to provide a user with one-time authentication/verification to multiple applications. In the present invention, sign-in credentials are authenticated with communications interface 16 using wireless communications as indicated by two-headed arrow 106, and are authenticated with visualization generator 24 using wireless communications 108. It is noted that authentication with communications interface 16 can be routed directly thereto or indirectly thereto through server/memory 20 without departing form the scope of the present invention.

Upon successful verification of the user authentication data provided to app 26, app 26 receives an authentication certificate that allows app 26 to automatically generate an image 262 at local computer 200 that displays multiple launch icons, each of which enables a user of local computer 200 to initiate control of an operational facet of compressor 12. As will be explained further below, the presence of the authentication certificate on local computer 200 enhances efficiency of system 10. Control of compressor 12 via app 26 is facilitated using wireless communication with communications interface 16, while real-time monitoring, past performance report generation, and predictive analytics report generation is facilitated using wireless communication 108 with visualization generator 24.

Figure 2:
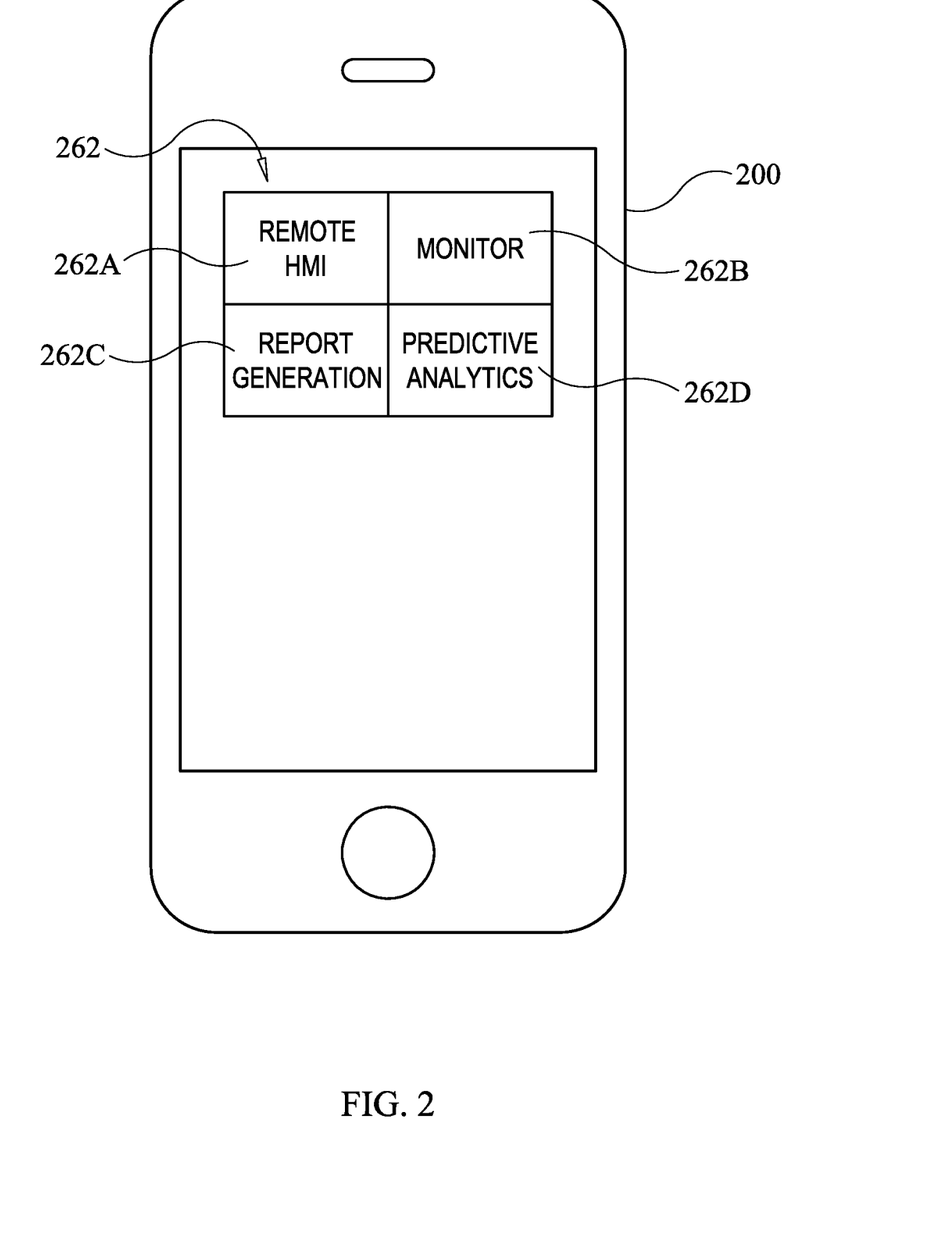
FIG. 2 is a screen image of simultaneously-illustrated application launch icons presented on a remote platform in accordance with an embodiment of the present invention.

Image 262 presents all of the apps simultaneously that have been verified for use by app 26. For example and as shown in FIG. 2, local computer 200 (e.g., a smart phone as illustrated) presents four launch application icons simultaneously. Launch icon 262A is configured to enable a wireless connection to communications interface 16 such that compressor 12 can be controlled remotely from local computer 200 as will be explained further below. Launch icon 262B is configured to enable a wireless connection to visualization generator 24 such that monitoring routines (e.g., "supervisory control and data acquisition" or SCADA routines) can be activated remotely from local computer 200. Launch icon 262C is configured to enable a wireless connection to visualization generator 24 such that a variety of report generation routines can be activated remotely from local computer 200. Launch icon 262D is configured to enable a wireless connection to visualization generator 24 such that a variety of predictive analytics report generation routines can be activated remotely from local computer 200. Additional icons and their associated apps can be made available on image 262 without departing from the scope of the present invention.

Figure 3:
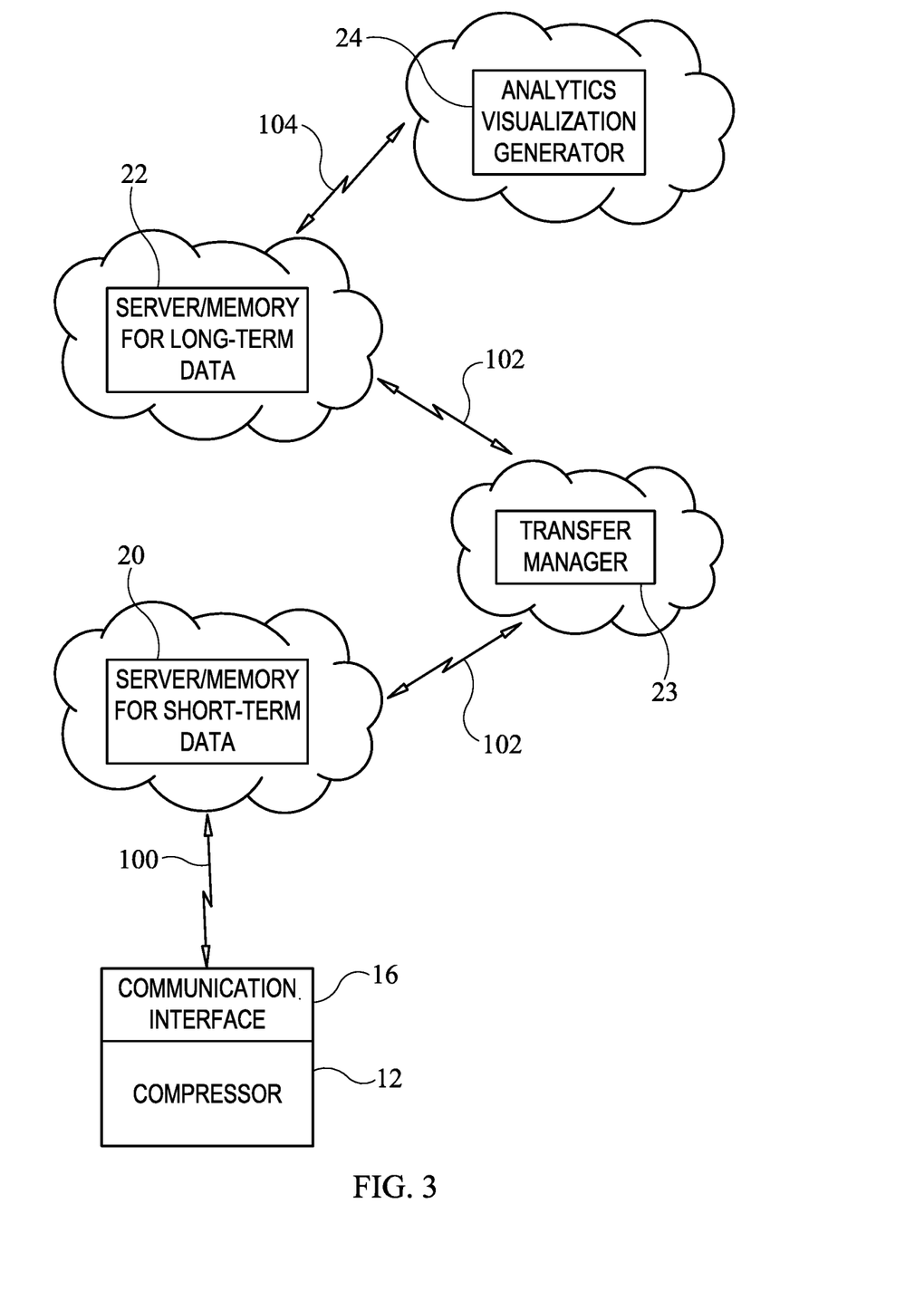
FIG. 3 is a schematic diagram illustrating the short-term and long-term data collection/storage and data utilization processes utilizing two servers/memories in accordance with an embodiment of the present invention.

Processes implemented by compressor system 10 will now be explained with reference to the schematic diagrams illustrated in FIGS. 3-5. Referring first to FIG. 3, a schematic diagram illustrates the short-term and long-term data collection/storage and data utilization processes implemented using server/memory 20 and server/memory 22. Each server/memory 20 and 22, as well as visualization generator 24, is internet-accessible or cloud-based. For example and as represented by the illustration, each can be an independent entity/system as indicated by the individual "clouds" around the entity/system. However, it is to be understood that more than one of server/memory 20, server/memory 22, and visualization generator 24 could be maintained at a single "cloud" facility without departing from the scope of the present invention. Server/memory 20 automatically collects data in real-time from compressor 12 as indicated by two-headed arrow 100 in accordance with the sampling/storage time parameters as explained earlier herein. Server/memory 22 automatically collects data from server/memory 20 as indicated by two-headed arrow 102 in accordance with the sampling/storage time parameters explained earlier herein. Visualization generator 24 can utilize the long-term data from server/memory 22 as well as the short-term data from server/memory 20. To facilitate both types of data transfers to visualization generator 24, a cloud-based transfer manager 23 provides server/memory 20 and server/memory 22 with data transfer instructions using communications 102.

As mentioned above, a large number of compressors 12 could be part of system 10. To assure processing efficiency and robust data collection, server/memory 20 has a single task, i.e., to collect data in the short-term from many compressors simultaneously. Server/memory 20 can include a backup server to carry on the short-term data collection function in the event of server malfunction without the risk of data loss. Server/memory 22 has just two functions, the first of which is to collect data associated with all compressors from server/memory 20 as a batch, e.g., using an Application Programming Interface (API). The second function of server/memory 22 is to respond to all requests from visualization generator 24. By using two servers 20 and 22, each server is better utilized owing to task specialization. Transfer manager 23 is a java based script that establishes a connection between server/memory 20 and server/memory 22 in accordance with a predetermined time period. Using an API, transfer manager 23 collects all data from server/memory 20 as a batch corresponding to compressor 12 (or a plurality of compressors as will typically be the case), and then instructs server/memory 22 to save that data for long-term archival.

Figure 4:
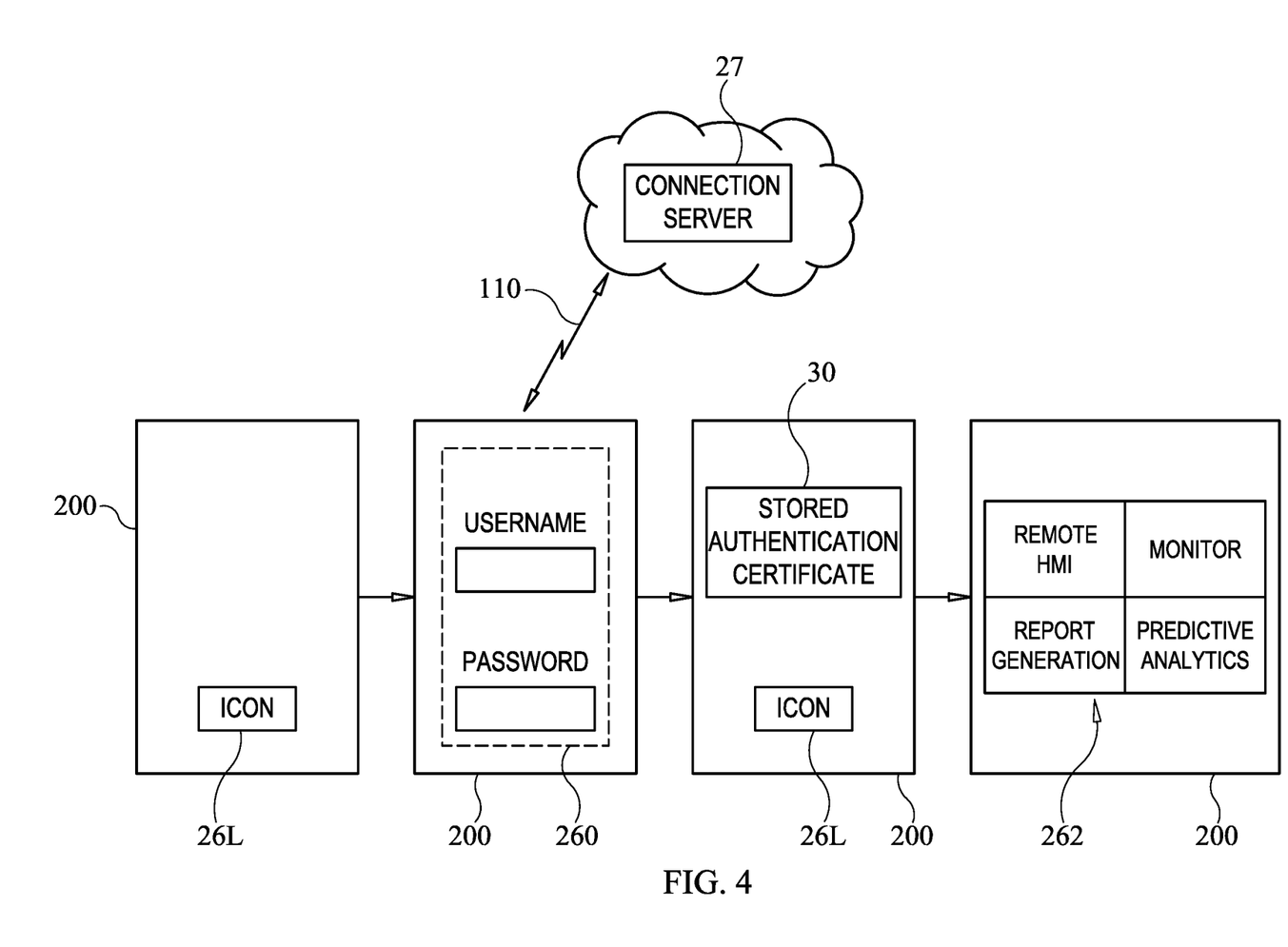
FIG. 4 is a schematic diagram illustrating the single-entry, multiple-app user authentication/verification and icon image generation process in accordance with an embodiment of the present invention.

Referring now to FIG. 4, a schematic diagram illustrates the process steps governing the single-entry, multiple-app user authentication/verification and icon image generation in accordance with an embodiment of the present invention. As described above, after app 26 is loaded onto local computer 200, user authentication across multiple applications is implemented. To minimize processing resources required at local computer 200, the present invention uses an internet-accessible connection server 27 to handle all authentication processing. Once app 26 is downloaded onto local computer 200, the app's launch icon 26L appears on local computer 200. Activating icon 26L generates sign-on display 260 to request the entry of a "USERNAME" and "PASSWORD". The entered username and password are transmitted using wireless communications 110 to connection server 27. If the username and password are verified, connection server 27 returns an authentication certificate (via two-way wireless communication 110) to local computer 200. The authentication certificate 30 is stored on local computer 200. Once stored on local computer 200, authentication certificate 30 permits the generation of the above-described image 262. That is, once authentication certificate 30 is supplied to and stored on local computer 200, activating the app's launch icon 26L causes automatic and immediate generation of image 262 thereby greatly enhancing a user's experience with system 10 as any launch icon to be included in image 262 is immediately and simultaneously made available after icon 26L is activated.

Figure 5:
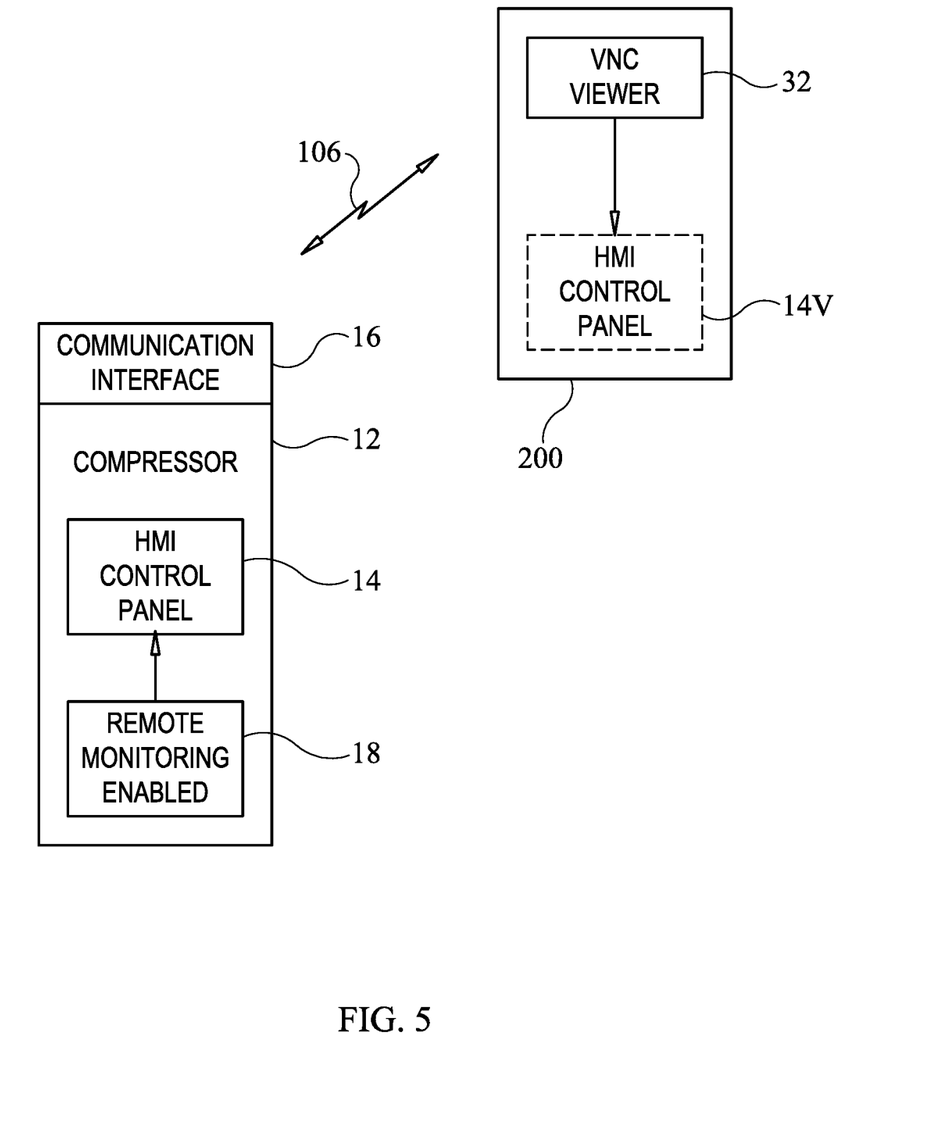
FIG. 5 is a schematic diagram illustrating establishment of remote operations control of a compressor in accordance with an embodiment of the present invention.

Referring now to FIG. 5, a schematic diagram illustrates the processing required to provide for establishment of remote control of the operations of compressor 12 from local computer 200 in accordance with an embodiment of the present invention. At compressor 12, HMI control panel 14 is enabled for remote monitoring 18 using, for example, an open source application such as SmartClient. By doing so, HMI control panel 14 is assigned an internet protocol (IP) address and login password that will be authenticated when app 26 is first launched as described above. Then, when the above-described launch icon 262A is activated via image 262, app 26 (via wireless communication indicated by two-headed arrow 106) causes a virtual network computing (VNC) viewer 32 to open at local computer 200 whereby the IP address of HMI control panel 14 on compressor 12 is read and used to transfer a virtual version 14V of HMI control panel 14 to local computer 200 for display and use such that a user has full control of HMI control panel 14 through local computer 200. Since the present invention uses the above-described single-entry authentication sign-in, the user of local computer 200 does not need to provide additional login/password credentials to access HMI control panel 14 at local computer 200. That is, once authentication certificate 30 is resident on local computer 200, activating launch icon 262A automatically establishes a virtual private network (VPN) tunnel between local computer 200 and the compressor's HMI control panel 14.

Figure 6:
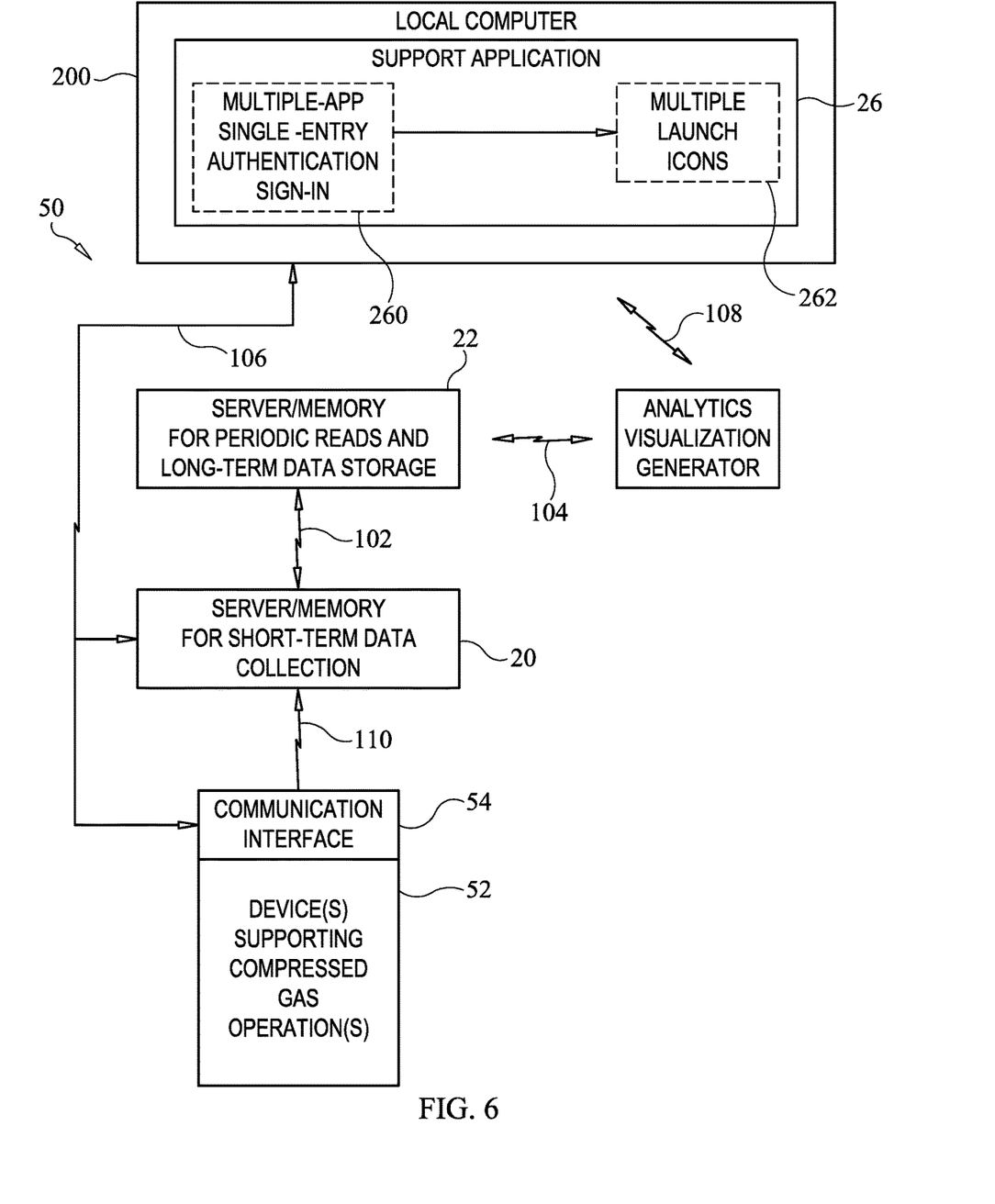
FIG. 6 is a schematic view of a system for monitoring and logging compressed gas data in accordance with an embodiment of the present invention.

The present invention can also be used to just monitor and log compressed gas data from devices that support a compressed gas operation that is part of, or separate from, a compressor's operation. Compressed gas data of interest can include, but is not limited to, gas pressure, gas temperature, gas flow rate, and gas quality attributes (e.g., detection of specific gas components, measuring amounts of specific gas components, humidity, dew point, toxicity, etc.). Referring now to FIG. 6, a system for monitoring and logging compressed gas data is shown and is referenced generally by numeral 50. System 50 includes a device (or a collection of devices) 52 that supports one or more compressed gas operations as will be explained further below. A communication interface 54 (i.e., analogous to the above-described communication interface 16) is coupled to device 52 so that compressed gas data associated with or sensed at device 52 can be transmitted wirelessly to server/memory 20 as indicated by arrow 110. The remaining elements of system 50 and their operation mimic the structure and function of the corresponding elements of system 10 as described previously herein.

Figure 7:
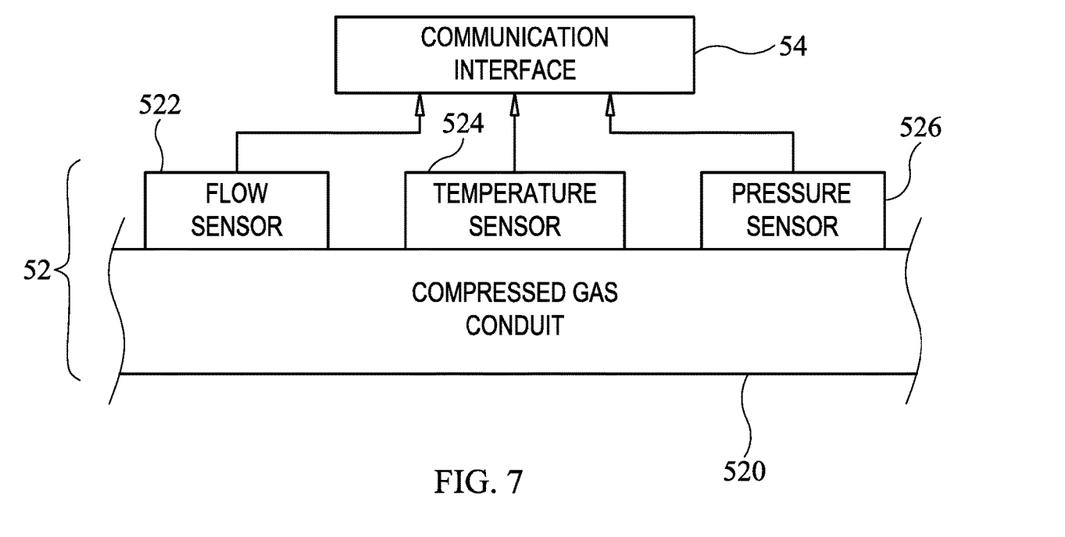
FIG. 7 is an isolated schematic view of a portion of a compressed gas-carrying conduit with a number of sensing devices configured to sense data related to the compressed gas moving through the conduit in accordance with an embodiment of the present invention.

As used herein, device 52 is representative of a variety of devices or collections thereof that support a compressed gas operation. Several non-limiting examples of device 52 will now be explained with reference to FIGS. 7-9. Referring first to FIG. 7, device 52 can include a compressed gas conduit 520 and one or more sensors for sensing attributes of the compressed gas moving through conduit 520. In the illustrated embodiment, such sensors include a flow sensor or meter 522, a gas temperature sensor 524, and a gas pressure sensor 526. More or fewer sensors can be provided depending on the application without departing from the scope of the present invention. The sensed data is provided to communication interface 54 for transmission therefrom as described above.

Figure 8:
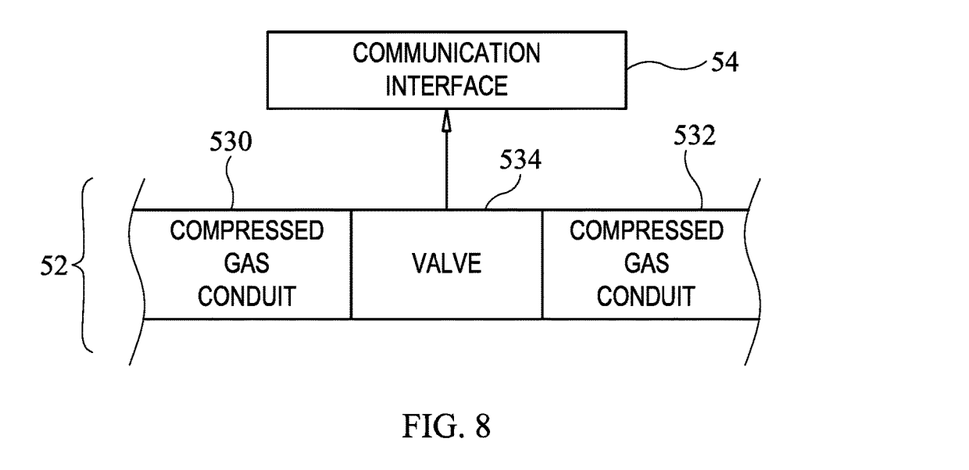
FIG. 8 is an isolated schematic view of portions of two compressed gas-carrying conduits adjoined by a valve configured to have its open/closed position sensed in accordance with another embodiment of the present invention.
Figure 9:
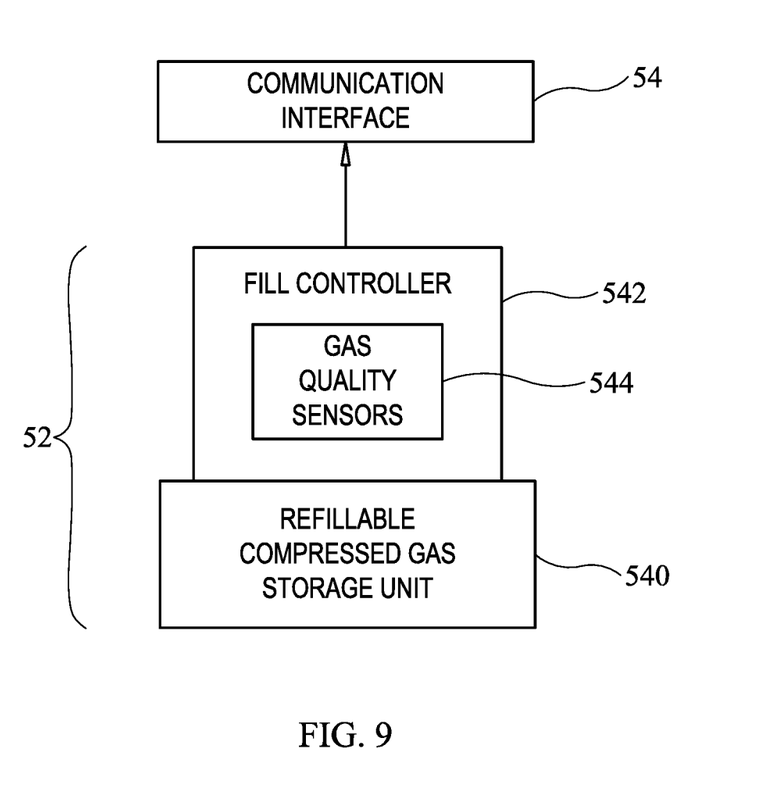
FIG. 9 is an isolated schematic view of a refillable compressed gas storage unit with a filler controller coupled thereto and configured to sense a plurality of compressed gas attributes in accordance with an embodiment of the present invention.

In FIG. 8, device 52 can include two compressed gas conduits (or reservoirs) 530 and 532 separated by a valve 534 that governs the flow between conduits 530 and 532. Data related to the valve's open/closed position (as an indication of flow rate there through) is provided to communication interface 54 for transmission therefrom. In FIG. 9, device 52 can include a refillable gas storage unit 540 (e.g., a compressed gas cylinder or tank containing breathing gas or other specific gas) and a fill controller 542 through which a compressed gas flows into or out of storage unit 540. For purposes of the present invention, fill controller 542 includes a number of gas quality sensors 544 for sensing gas quality attributes of the compressed gas flowing into, out of, and/or stored within storage unit 540. For example, when storage unit 540 is used to store compressed breathing gas, sensors 544 included in fill controller 542 could be configured to detect and/or measure one or more of oxygen, carbon monoxide, carbon dioxide, humidity, dew point, pressure dew point, VOCs, oil, helium, sulfur dioxide, nitrous oxide, and nitrogen dioxide.

Figure 10:
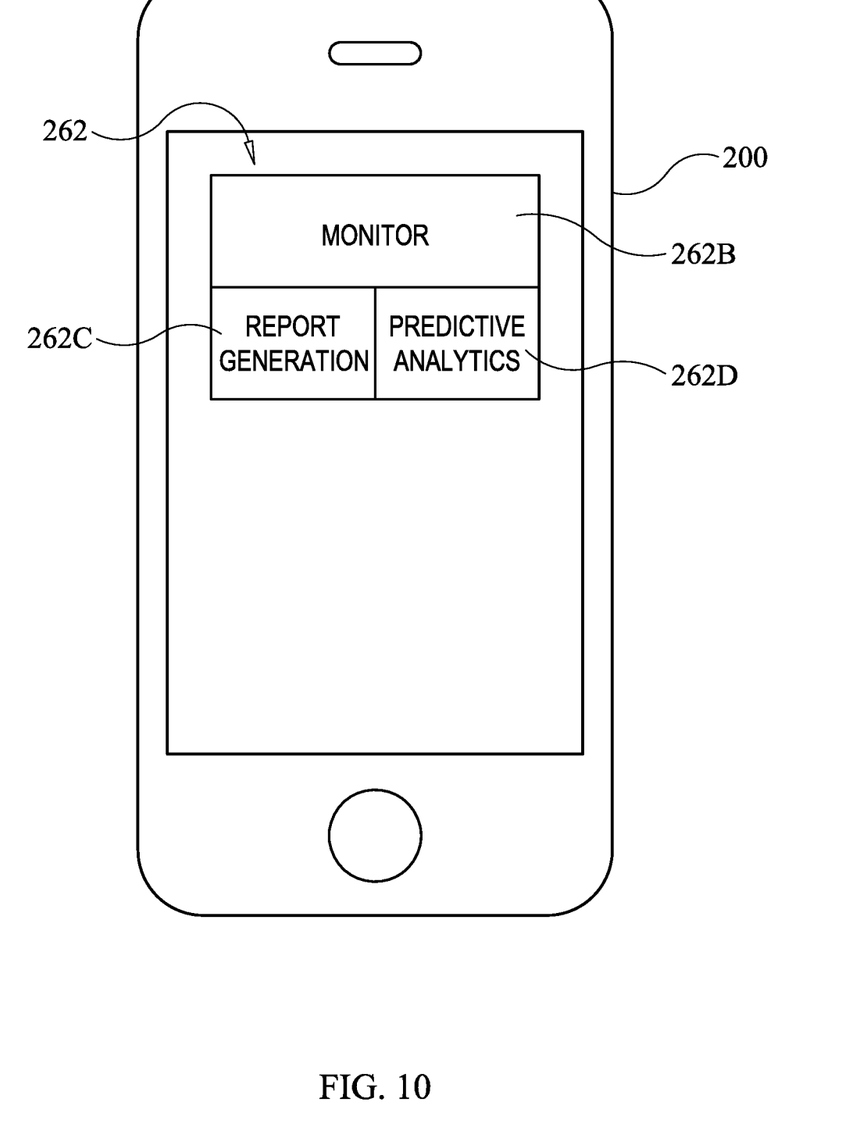
FIG. 10 is a screen image of simultaneously-illustrated application launch icons presented on a remote platform for compressed gas data monitoring and logging in accordance with an embodiment of the present invention.

The monitored and logged compressed gas data can be viewed and/or used in report generation and predictive analytics at local computer 200. As described above, image 262 on local computer 200 (FIG. 2) presents all of the apps simultaneously that have been verified for use by support app 26. For the data monitoring and logging embodiment of the present invention, image 262 on local computer 200 (e.g., a smart phone as illustrated) presents three launch application icons 262B-262D simultaneously as shown in FIG. 10. As described above, launch icon 262B is configured to enable a wireless connection to visualization generator 24 such that monitoring routines (e.g., "supervisory control and data acquisition" or SCADA routines) can be activated remotely from local computer 200. Launch icon 262C is configured to enable a wireless connection to visualization generator 24 such that a variety of report generation routines can be activated remotely from local computer 200. Launch icon 262D is configured to enable a wireless connection to visualization generator 24 such that a variety of predictive analytics report generation routines can be activated remotely from local computer 200. Additional icons and their associated apps can be made available on image 262 without departing from the scope of the present invention.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for monitoring and logging compressed gas data, comprising the steps of:
    coupling a communication interface to a device supporting at least one of flow and storage of a compressed gas, the device sensing data related to the compressed gas;
    automatically collecting said data via the communication interface at a first data store every first time increment of a first time period wherein, at a conclusion of each said first time period, the first data store employs a wraparound storage scheme;
    automatically collecting portions of said data from the first data store at a second data store every second time increment of each said first time period, wherein said second time increment is greater than said first time increment and wherein said portions of said data are collected for a second time period which is greater than said first time period;
    coupling an analytics visualization generator to the second data store, the analytics visualization generator programmed with a plurality of diagnostic routines for generating visual diagnostics using at least one of said data in the first data store and said portions of said data in the second data store;
    collecting user authentication data at a local computer that is located remotely with respect to the device; and
    automatically verifying said user authentication data with the communication interface and the analytics visualization generator,
    wherein successful verification of said user authentication data permits automatic generation of an image comprising a plurality of application icons at the local computer, each of said application icons enabling a connection from the local computer to one of the communication interface and the analytics visualization generator to thereby enable the local computer as an input device for origination and transmission of selections of said plurality of diagnostic routines to the analytics visualization generator.

2. A method according to claim 1, wherein said first time increment is less than ten seconds, and wherein said first time period is less than thirty days.

3. A method according to claim 1, wherein said second time increment is at least one minute, and wherein said second time period comprises a plurality of years.

4. A method according to claim 1, wherein said first time increment is less than ten seconds, said first time period is less than thirty days, said second time increment is at least one minute, and said second time period comprises a plurality of years.

5. A method according to claim 1, wherein the local computer comprises a hand-held wireless device.

6. A method according to claim 1, wherein the first data store comprises a portion of a first server, and wherein the second data store comprises a portion of a second server.

7. A method according to claim 1, wherein said plurality of diagnostic routines includes SCADA routines, report generation routines, and predictive analytics routines, and wherein said application icons comprise:
a first icon configured to enable said connection to the analytics visualization generator wherein said SCADA routines are enabled at the local computer;
a second icon configured to enable said connection to the analytics visualization generator wherein said report generation routines are enabled at the local computer; and
a third icon configured to enable said connection to the analytics visualization generator wherein said predictive analytics routines are enabled at the local computer.

8. A method according to claim 7, wherein said first icon, said second icon, and said third icon appear simultaneously in said image.

9. A method for monitoring and logging compressed gas data from a device supporting at least one of flow and storage of a compressed gas and sensing data related to the compressed gas wherein the device has a communication interface coupled thereto for relaying the data using a wireless communication protocol, the method comprising the steps of:
automatically collecting the data via the communication interface at a first data store every first time increment of a first time period wherein, at a conclusion of each said first time period, the first data store employs a wraparound storage scheme;
automatically collecting portions of the data from the first data store at a second data store every second time increment of each said first time period, wherein said second time increment is greater than said first time increment and wherein said portions of the data are collected for a second time period which is greater than said first time period;
coupling an analytics visualization generator to the second data store, the analytics visualization generator programmed with a plurality of diagnostic routines for generating visual diagnostics using at least one of the data in the first data store and said portions of the data in the second data store;
collecting user authentication data at a local computer that is located remotely with respect to the device; and
automatically verifying said user authentication data with the communication interface and the analytics visualization generator,
wherein successful verification of said user authentication data causes an authentication certificate to be stored on the local computer, wherein presence of said authentication certificate on the local computer permits generation of an image comprising a plurality of application icons at the local computer, each of said application icons enabling a connection from the local computer to one of the communication interface and the analytics visualization generator to thereby enable the local computer as an input device for origination and transmission of selections of said plurality of diagnostic routines to the analytics visualization generator.

10. A method according to claim 9, wherein said first time increment is less than ten seconds, and wherein said first time period is less than thirty days.

11. A method according to claim 9, wherein said second time increment is at least one minute, and wherein said second time period comprises a plurality of years.

12. A method according to claim 9, wherein said first time increment is less than ten seconds, said first time period is less than thirty days, said second time increment is at least one minute, and said second time period comprises a plurality of years.

13. A method according to claim 9, wherein the local computer comprises a hand-held wireless device.

14. A method according to claim 9, wherein the first data store comprises a portion of a first server, and wherein the second data store comprises a portion of a second server.

15. A method according to claim 9, wherein said plurality of diagnostic routines includes SCADA routines, report generation routines, and predictive analytics routines, and wherein said application icons comprise:
a first icon configured to enable said connection to the analytics visualization generator wherein said SCADA routines are enabled at the local computer;
a second icon configured to enable said connection to the analytics visualization generator wherein said report generation routines are enabled at the local computer; and
a third icon configured to enable said connection to the analytics visualization generator wherein said predictive analytics routines are enabled at the local computer.

16. A method according to claim 15, wherein said first icon, said second icon, and said third icon appear simultaneously in said image.

17. A method for monitoring and logging compressed gas data over a network, comprising the steps of:
providing a support application to a subscriber for installation on a local computer accessible by the subscriber;
coupling a communication interface to a device supporting at least one of flow and storage of a compressed gas and sensing data related to the compressed gas, wherein the communication device relays the data over the network using a wireless communication protocol;
automatically collecting the data relayed over the network via the communication interface at a first data store every first time increment of a first time period wherein, at a conclusion of each said first time period, the first data store employs a wraparound storage scheme;
automatically collecting portions of the data from the first data store at a second data store every second time increment of each said first time period, wherein said second time increment is greater than said first time increment and wherein said portions of the data are collected for a second time period which is greater than said first time period;

coupling an analytics visualization generator to the second data store, the analytics visualization generator programmed with a plurality of diagnostic routines for generating visual diagnostics using at least one of the data in the first data store and said portions of the data in the second data store;

collecting user authentication data at the local computer using the support application, wherein the support application automatically transmits said user authentication data over the network for verification by the communication interface and the analytics visualization generator, and wherein, following successful verification of said user authentication data, an authentication certificate is stored on the local computer, wherein presence of said authentication certificate on the local computer permits the support application to automatically generate an image comprising a plurality of application icons at the local computer, each of said application icons enabling a connection from the local computer to one of the communication interface and the analytics visualization generator to thereby enable the local computer as an input device for origination and transmission of selections of said plurality of diagnostic routines to the analytics visualization generator over the network.

18. A method according to claim 17, wherein said first time increment is less than ten seconds, and wherein said first time period is less than thirty days.

19. A method according to claim 17, wherein said second time increment is at least one minute, and wherein said second time period comprises a plurality of years.

20. A method according to claim 17, wherein said first time increment is less than ten seconds, said first time period is less than thirty days, said second time increment is at least one minute, and said second time period comprises a plurality of years.

21. A method according to claim 17, wherein the local computer comprises a hand-held wireless device.

22. A method according to claim 17, wherein the first data store comprises a portion of a first server, and wherein the second data store comprises a portion of a second server.

23. A method according to claim 17, wherein said plurality of diagnostic routines includes SCADA routines, report generation routines, and predictive analytics routines, and wherein said application icons comprise:
  a first icon configured to enable said connection to the analytics visualization generator wherein said SCADA routines are enabled at the local computer;
  a second icon configured to enable said connection to the analytics visualization generator wherein said report generation routines are enabled at the local computer; and
  a third icon configured to enable said connection to the analytics visualization generator wherein said predictive analytics routines are enabled at the local computer.

24. A method according to claim 23, wherein said first icon, said second icon, and said third icon appear simultaneously in said image.

25. A compressed gas data monitoring and logging system, comprising:
  a device adapted to support at least one of flow and storage of a compressed gas, said device sensing data related to the compressed gas;
  a communication interface coupled to said device and adapted to transmit said data from said device over a network;
  a first data store configured to automatically collect said data from said communication device over the network every first time increment of a first time period wherein, at a conclusion of each said first time period, said first data store employs a wraparound storage scheme;
  a second data store configured to automatically collect portions of said data from said first data store every second time increment of each said first time period, wherein said second time increment is greater than said first time increment and wherein said portions of said data are collected for a second time period which is greater than said first time period;
  an analytics visualization generator coupled to said second data store, said analytics visualization generator programmed with a plurality of diagnostic routines for generating visual diagnostics using at least one of said data in said first data store and said portions of said data in said second data store; and
  a support application adapted to be installed on a local computer which has a processor, a memory and a wireless transceiver adapted for communication on the network, and which is remotely located with respect to said device wherein, when a user of the local computer activates said support application,
  user authentication data is requested for input at the local computer by said support application,
  said support application automatically transmits said user authentication data input at the local computer over the network to said communication interface and said analytics visualization generator, and
  wherein, following successful verification of said user authentication data, an authentication certificate is stored on the local computer, wherein presence of said authentication certificate on the local computer permits said support application to generate an image at the local computer, said image comprising a plurality of application icons, each of said application icons enabling a connection over the network from the local computer to one of said communication interface and said analytics visualization generator to thereby enable the local computer as an input device for origination and transmission of selections of said plurality of diagnostic routines over the network.

26. A system as in claim 25, wherein said first time increment is less than ten seconds, and wherein said first time period is less than thirty days.

27. A system as in claim 25, wherein said second time increment is at least one minute, and wherein said second time period comprises a plurality of years.

28. A system as in claim 25, wherein said first time increment is less than ten seconds, said first time period is less than thirty days, said second time increment is at least one minute, and said second time period comprises a plurality of years.

29. A system as in claim 25, wherein said plurality of diagnostic routines includes SCADA routines, report generation routines, and predictive analytics routines, and wherein said application icons comprise:
  a first icon configured to enable said connection to the analytics visualization generator wherein said SCADA routines are enabled at the local computer;

a second icon configured to enable said connection to the analytics visualization generator wherein said report generation routines are enabled at the local computer; and a third icon configured to enable said connection to the analytics visualization generator wherein said predictive analytics routines are enabled at the local computer.

30. A system as in claim 29, wherein said first icon, said second icon, and said third icon appear simultaneously in said image.

31. A system as in claim 25, wherein said device includes at least one gas conduit.

32. A system as in claim 25, wherein said device includes a refillable compressed gas storage unit.

* * * * *